(12) United States Patent
Heinrich et al.

(10) Patent No.: US 10,513,061 B2
(45) Date of Patent: Dec. 24, 2019

(54) ROTARY TABLET PRESS AND METHOD FOR PRESSING TABLETS IN A ROTARY TABLET PRESS

(71) Applicant: Fette Compacting GmbH, Schwarzenbek (DE)

(72) Inventors: Thomas Heinrich, Stelle (DE); Ingo Schmidt, Schwarzenbek (DE); Jan Naeve, Gudow (DE)

(73) Assignee: Fette Compacting GmbH, Schwarzenbek (DE)

(*) Notice: Subject to any disclaimer, the term of this patent is extended or adjusted under 35 U.S.C. 154(b) by 0 days.

(21) Appl. No.: 16/055,788

(22) Filed: Aug. 6, 2018

(65) Prior Publication Data

US 2019/0039270 A1    Feb. 7, 2019

Related U.S. Application Data

(60) Division of application No. 15/144,167, filed on May 2, 2016, now Pat. No. 10,207,433, which is a
(Continued)

(30) Foreign Application Priority Data

Jan. 27, 2010    (DE) .................. 10 2010 005 780

(51) Int. Cl.
*B29C 43/00*     (2006.01)
*B30B 11/02*    (2006.01)
(Continued)

(52) U.S. Cl.
CPC .......... *B29C 43/006* (2013.01); *B30B 11/022* (2013.01); *B30B 11/08* (2013.01); *B29L 2031/00* (2013.01)

(58) Field of Classification Search
CPC ....... B30B 11/10; B30B 11/08; B30B 11/022; B30B 11/025; B30B 11/027
See application file for complete search history.

(56) References Cited

U.S. PATENT DOCUMENTS 9,327,469 B2    5/2016    Heinrich et al.
2007/0241127 A1    10/2007    Schmidt et al.

FOREIGN PATENT DOCUMENTS

DE    19945155    6/2001
DE    10142624    4/2003
(Continued)

*Primary Examiner* — Stella K Yi
(74) *Attorney, Agent, or Firm* — Vidas Arrett & Steinkraus P.A.

(57) ABSTRACT

The invention relates to a rotary tablet press comprising: a rotatingly drivable rotor, having a die plate comprising die holes and assigned to the die holes upper and lower punches, rotating synchronously with the die plate, whose axial movement is controlled by upper and lower control cams, having at least one filling station comprising at least one filling device for filling the die holes with material to be pressed, having at least one compression station disposed downstream of the filling station in the rotational direction of the rotor, comprising at least one pressing device which presses the upper and/or lower punches into the die holes when passing through the compression station in order to press the filled material in the die holes, and having at least one ejector station, disposed downstream of the compression station in the rotational direction of the rotor, comprising an ejector device for ejecting the pressed tablets in the die holes, characterized in that at least one vibration generator is provided in the circumferential direction of the upper and lower punches between the filling station and the ejector station that at least temporarily vibrates the upper and/or lower punches at least at the compression station and/or at
(Continued)

Figure 1:
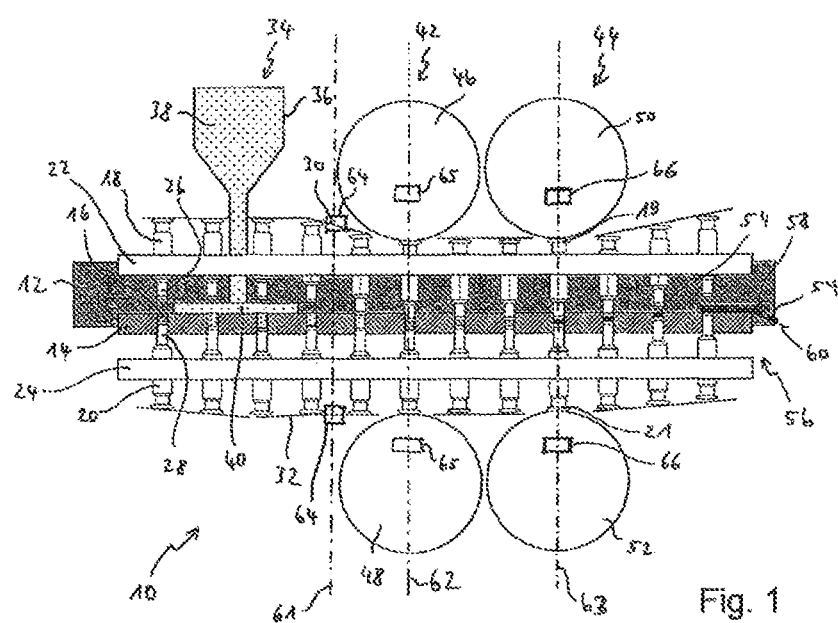

the filling station and/or at least at an upper control cam and/or at least at a lower control cam.

7 Claims, 2 Drawing Sheets

Related U.S. Application Data continuation of application No. 13/013,439, filed on Jan. 25, 2011, now Pat. No. 9,327,469.

(51) Int. Cl.
*B30B 11/08* (2006.01)
*B29L 31/00* (2006.01)

(56) References Cited

FOREIGN PATENT DOCUMENTS

| | | |
|---|---|---|
| DE | 10318529 | 11/2004 |
| RU | 40249 | * 11/2002 |
| SU | 1648792 | 5/1991 |
| WO | 01/21388 A1 | 3/2001 |

* cited by examiner

ROTARY TABLET PRESS AND METHOD FOR PRESSING TABLETS IN A ROTARY TABLET PRESS

CROSS-REFERENCE TO RELATED APPLICATIONS

This application is a divisional application of U.S. application Ser. No. 15/144,167, filed May 2, 2016, which claims priority from patent application Ser. No. 13/013,439, filed Jan. 25, 2011, issued May 3, 2015 as U.S. Pat. No. 9,327,469, the entire contents of both of which are hereby incorporated by reference.

STATEMENT REGARDING FEDERALLY SPONSORED RESEARCH

Not applicable.

BACKGROUND OF THE INVENTION

The invention relates to a rotary tablet press comprising a rotatingly drivable rotor, having a die plate comprising die holes and assigned to the die holes upper and lower punches, rotating synchronously with the die plate, whose axial movement is controlled by upper and lower control cams, having at least one filling station comprising at least one filling device for filling the die holes with material to be compressed, having at least one compression station disposed downstream of the filling station in the rotational direction of the rotor, comprising at least one compression device which presses the upper and/or lower punches into the die holes when passing through the compression station in order to press the filled material in the die holes, and having at least one ejector station, disposed downstream of the compression station in the rotational direction of the rotor, comprising an ejector device for ejecting the tablets press in the die holes.

The invention also relates to a method for pressing tablets in a rotary tablet press, comprising the steps: a rotor, having a die plate comprising die holes and assigned to the die holes upper and lower punches, rotating synchronously with the die plate, whose axial movement is controlled by control cams, is driven in a rotational manner, in the course of its rotation in at least one filling station, the die holes are filled with material to be compressed, in at least one compression station disposed downstream of the filling station in the rotational direction of the rotor, the upper and/or lower punches are pressed into the die holes, wherein the material filled into the die holes is compressed, the pressed tablets in the die holes are ejected in at least one ejector station disposed downstream of a compression station in the rotational direction of the rotor.

Such tablet presses typically comprise a machine frame in which the rotor is disposed in a rotational manner. The rotor is populated with a number of dies and an equal number of upper and lower punches. Typically, a die filling device, a dosing station, a pre-compression and main compression station, and an ejector station for ejecting pressed tablets, are located on an outer pitch circle. The pre-compression and main compression stations can each comprise, for example, an upper and lower compression roller. Here, the compression process of the powdered material, for instance, filled into the die holes begins already in the region in which the appropriate control cam guides the punch into the die hole. This compression process is then continued in the pre-compression station using a comparatively low pressing force. In the main compression station, the compression is then completed using a substantially greater pressing force than in the pre-compression station. The mechanical deformation behavior of pressed masses and granulates can vary widely and depends substantially on the respective powder mixtures of active agent, binding agent, disintigrant, filling agent, lubricant, etc. During tablet pressing in such tablet presses, a problem arises in the so-called covers in which cracks form within the pellets when the tablets are ejected out of the die holes. A further problem exists in that the tablets to be pressed do not always attain the required fracture resistance. Until now, it has been attempted to counteract this problem using a variation of the pre-compression force in the pre-compression station. In practice, however, the known procedure does not always lead to satisfactory results.

Starting from the described prior art as a background, the object of the present invention is therefore to provide a rotary tablet press and a method of the initially named type, with which tablets can be pressed that always have the required fracture resistance, wherein crack formation is reliably prevented.

The objective is solved according to the invention by the subject matter of the claims 1 and 8. Advantageous embodiments are found in the dependent claims, the description and in the figures.

For a rotary tablet press of the initially named type, the invention solves the object in that at least one oscillation generator is provided in the rotational direction of the upper and lower punches between the filling station and the ejector station that at least temporarily oscillates the upper and/or lower punches at least at the compression station and/or at the filling station and/or at least at an upper control cam and/or at least a lower control cam. For a method of the initially named type, the object of the invention is solved in that the upper and/or lower punches oscillate at least temporarily, between the filling station and the ejection station in the rotational direction, at least at the compression station and/or at the filling station and/or at least at an upper control cam and/or at least at a lower control cam.

The rotor is mounted, for example, in a machine frame and can be driven in a rotational manner about a vertical axis. The number of upper and lower punches corresponds to the number of die holes of the rotor. The upper and lower punches are usually guided in guides. They are controlled during circulation in a known manner using control cams. The material to be pressed can be a powder. Pharmaceutical tablets, for example, can be pressed. A dosing station is usually disposed downstream of the filling station. The filling station, the dosing station and the compression station are located at an outer pitch circle of the rotor aligned with the punches and die holes. Sometimes, only the upper punch is pressed downward into the die hole, whereas the lower punch is held in a fixed position in the die hole. It is also possible, however, that in the compression station the upper and lower punches are moved simultaneously or successively towards one another in the holes. In both cases, the material located on the lower punch in the die hole is compressed. Sleeves or dies can be disposed in the die holes that are then filled with the material to be pressed. In the ejector station, the upper punches are removed upward from the die holes in a known manner, and the lower punches are guided upward through the die holes, wherein they move the compressed tablets in the holes onto the surface of the die plate. From there, they are led, for example, by a deflector to, for example, an outlet which diverts them out of the press and leads them to further use, such as to packaging. Naturally, for instance, two filling stations and compression stations and possibly ejector stations can also be provided respectively at the press.

The compacting process of the, for example, powdered material filled into the die holes can be divided into several phases. In a first phase the particles are re-oriented. In a second phase the particles are elastically and plastically deformed. In the third and final pressing phase, the particles are bonded to each other. The invention is based on the recognition that inner tensions generated in the compressed tablets during these phases can lead to the initially mentioned crack formation and fracture resistance problems. Furthermore according to the invention, it was recognized that these inner tensions can arise during the compression procedure due to the inclusion of air. For avoiding this air inclusion, according to the invention the upper and/or lower punch compressing the material is vibrated during the compaction process of the, for instance, powdered material located in the die holes. For this purpose, one or more vibration generators are disposed in the area between the filling device and the ejector station. The punches can be activated by these generators, in particular, to vibrate in a vertical direction. However, additionally or alternatively, vibrations in other directions are conceivable. The vibration of the punches can occur, in particular, during a main compression phase in the main compression station. However, they can also occur already during the pre-compression phase in a pre-compression station. According to the invention, it has been recognized in particular that it is advantageous already upon the upper punch entering into the die hole, before arriving at a pre-compression station, to vibrate the punch, controlled by an appropriate control cam (pull-down cam). The vibration leads to the fact that the material located in the die holes or the dies is distributed more homogenously, and in this manner the inclusion of air is reliably avoided. Thereby, in turn, cracks in the pellets are avoided during ejection from the dies. In particular, the powder particles to be pressed in the three compression phases described above are optimally distributed and bonded to each other. At the same time, the required fracture resistance of the tablets can be assured in this manner at all times.

The arrangement of the vibration generator(s) is possible at different locations substantially along the common vertical force progression axis. The vertical force progression axis extends in the vertical direction along the entire press, for example, through the centers of the possibly provided upper and lower pull-down cams or pre-compression rollers or main compression rollers. For example, a stimulation to vibration of the pull-down cams and the pre-compression rollers or main compression rollers, leads likewise to a vibration of the upper and lower punches controlled by these. A suitable control device can be provided. It controls the vibration generator(s) in the manner according to the invention.

Thus, according to the invention, air inclusions are substantially avoided. Thereby, inner tensions in the pellets are avoided, and the cover tendency is also reduced. This, in turn, minimizes tablet waste. At the same time, a higher fracture resistance and, in particular, the respectively required fracture resistance, is attained with a lower compression force. This in turn leads to an improved running smoothness of the press, and with it, to lower sound emissions. Also as a result, the wear, particularly of the press devices such as the compression rollers and the punch heads interacting with them, is reduced. The energy expenditure per tablet produced can be reduced, which also results in a cost reduction. According to the invention, the possibility of direct compression also exists. Thus, in the prior art, the powder to be compressed is frequently fed in advance to a granulating process in order to improve the subsequent suitability for tabletting the press masses in the press. According to the invention, this costly granulating process can be omitted.

According to one embodiment, at least one vibration generator can be disposed between the filling station and the compression station in the region of an upper and/or lower control cam for the upper and/or lower punch, thus in particular, at a pull-down cam, that at least temporarily vibrates the upper and/or lower punches while passing the upper and/or lower control cam. This embodiment takes into account the realization that it is advantageous for the punch to vibrate already upon entrance of the punch into the die hole.

According to a further embodiment, the compression station can comprise at least an upper and/or lower compression roller, which press the upper and/or lower punches into the die holes while passing through the compression station. In the pre-compression station, the material to be compressed is initially compressed using a comparatively low pressing force. In the main compression station, the compression is completed using a significantly higher pressing force than in the pre-compression station. In this case, the pre-compression station can correspondingly comprise an upper and lower pre-compression roller, and the main compression station can comprise an upper and lower main compression roller. However, instead of compression rollers, in principle, pressure rails or cam tracks, for example, can also be used. However, it is also conceivable to omit the pre-compression station.

According to a further embodiment, at least one vibration generator can be disposed at the compression station that at least temporarily vibrates the upper and/or lower punches in the compression station. If the compression station comprises a pre-compression station and a main compression station, at least one vibration generator can be disposed at the pre-compression station and/or the main compression station that at least temporarily vibrates the upper and/or lower punches in the pre-compression station and/or the main compression station. The vibration generator(s) can be disposed in particular along a vertical axis running through the centers of the upper and lower pre-compression rollers and/or main compression rollers, such that the punches vibrate while passing through the pre-compression and/or main compression rollers. In particular, the vertical force progression axis containing the vibration generator(s) can extend through the pre-compression station or main compression station.

The vibration actuators according to the invention can be of various types. For example, ultrasonic vibration generators and/or electrical vibration generators and/or mechanical vibration generators can be considered. Piezoelectric elements, for example, can be considered as electrical vibration actuators.

The vibrations of the upper and/or lower punches are superimposed on the progression of the pressing force during the compression of the material located in the dies, and have a higher frequency than the progression of the pressing force. Initially during the compression, the pressing force increases during the entry of the upper punch into the die, in particular, up to a maximum when the material is completely compressed by the punch. During subsequent removal of the upper punch from the die, the pressing force correspondingly decreases again. This pressing force progression repeats from punch pair to punch pair, and in total, has the progression of a standard sine curve. For attaining the advantages according to the invention, the vibration frequency forced upon the upper and lower punches should be substantially higher than the frequency of the pressing force progression. The appropriate vibration frequency depends, for example, on the properties of the material to be compressed, the compacting forces and the rotational speed of the rotor in the scope of the compression. Purely as an example, vibration frequencies are in the range of 50 Hz to 50 kHz.

According to a further embodiment, the upper and/or lower punches can be vibrated during the entire compression of material filled into the die holes. The vibration generators are then appropriately controlled in this manner by a control device. According to this embodiment, the entire compression procedure in the dies is advantageously influenced in the manner according to the invention. If a pre-compression station and a main compression station are provided, the punches can vibrate, for example during the entire compression in the pre-compression station and main compression station and already during the pass of a pull-down cam. However, it is also possible that the punches vibrate, for example, only during the compression in the main compression station.

Figure 3:
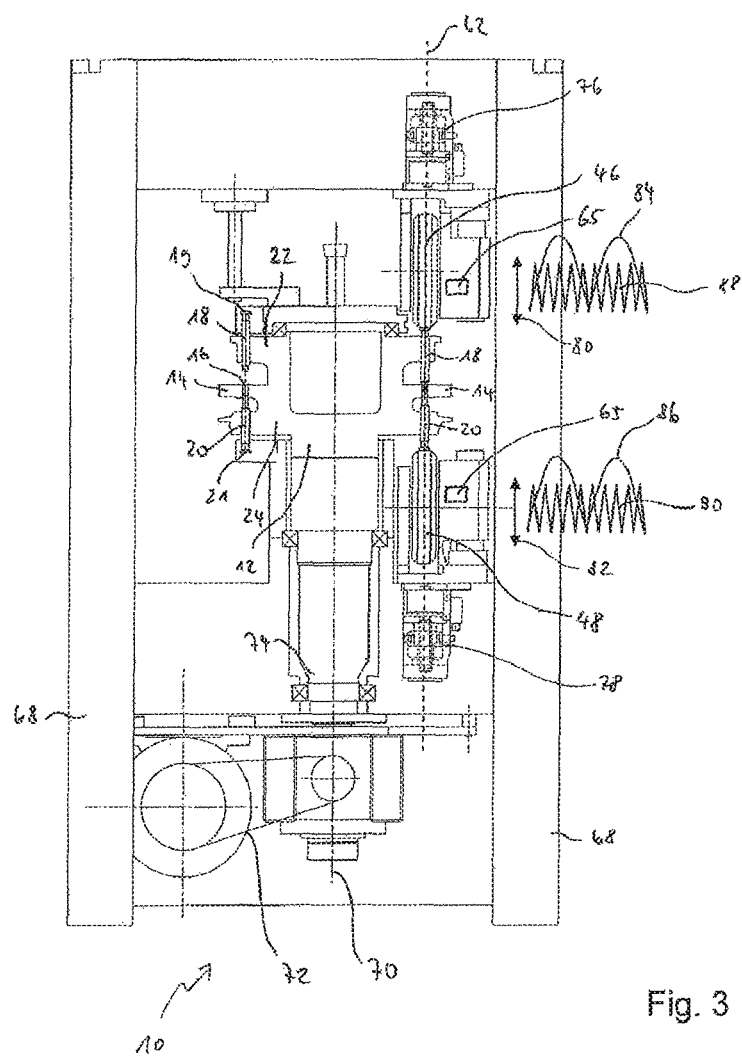

An example embodiment of the invention is explained in more detail in the following using the figures. They show:

FIG. 1 a part of a rotary tablet press according to the invention in an straightened vertical sectional representation for illustration purposes, FIG. 2 a diagram for illustrating the phases of the compression procedure, and FIG. 3 the rotary tablet press shown in FIG. 1 in a further vertical sectional representation.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In the figures, the same reference numbers refer to the same objects unless indicated otherwise. In FIG. 1, parts of a tablet press 10 according to the invention are shown with a straightened rotor for the purposes of illustration. The schematically represented rotor 12 comprises a die plate 14 having a plurality of die holes 16. A pair, comprised of an upper punch 18 and a lower punch 20, which are respectively guided in an upper guide disk 22 and a lower guide disk 24, is assigned to each of the die holes 16 and rotate synchronously with the die plate 14. The upper and lower punches 18, 20 are disposed in such a way that they can be guided with their respective pressing area 26, 28 into the die holes 16. Dies can be located in the die holes 16. The movement of the upper and lower punches 18, 20 is controlled by upper and lower control cams 30, 32 interacting with the heads of the punches 18, 20. This is known per se. The press 10 shown in FIG. 1 further comprises a filling station 34 having a filling device 36. The filling device 36 comprises a funnel shaped hopper reservoir 38, in which powdered tablet material to be pressed is located. The collecting reservoir 38 is connected to a filling shoe 40 supported on the top side of the die plate 14. When the rotor 12 is driven rotating about a vertical axis of rotation, the upper and lower punches 18, 20, move together with the die plate 14 from left to right, in the example shown in FIG. 1. In the process, they pass through the filling station 34 and, in particular, pass beneath the filling shoe 40 through the latter. In the process, die holes 16 are filled. The fill height is determined by the vertical position of the lower punch 20 that is specified by the lower control cams 32.

A pre-compression station 42 and a main compression station 44 are located downstream of the filling station 34 in the rotational direction of the rotor 12. The pre-compression station 42 comprises an upper pre-compression roller 46 and a lower pre-compression roller 48. Correspondingly, the main compression station 44 comprises an upper main compression roller 50 and a lower main compression roller 52. The compression rollers 46, 48, 50, 52 interact in a known manner with the punch heads of the upper and lower punches 18, 20. In the example shown, the upper punches 18, in the course of their entrance into the pre-compression station 42, move downward onto the die hole 16 respectively assigned to them. The upper punches 18 are then pressed into the holes 16 by the upper pre-compression roller 46. The lower punches 20 are simultaneously held in their vertical position by the lower pre-compression roller 48. This results in a pre-compression of the powdered material located in the holes 16 using a comparatively low pressing force. The final compression of the powdered material occurs in the subsequent main compression station 44. In the example shown, the lower punches 20, in particular, are pressed by the lower main compression roller 52 in the vertical direction upward into the die holes 16. In the process, the upper main compression roller 50 holds the upper punches 18 in their respective vertical position. This results in a final compression of the material of the tablets 54 to be produced that is located in the die holes 16. The pellets are subsequently ejected at an ejector station 56. For this purpose, initially the upper punches 18, controlled by the upper and lower control cams 30, 32, are lifted out of the die holes 16. Simultaneously, the lower punches 20 are pushed upward through the die holes 16, so that they transport the tablets 54 onto the surface of the die plate 14. The ejector station comprises an ejector device 58, presently a deflector 58, which delivers the tablets 54 to an outlet 60. From there, the tablets are led out of the press 10 and supplied for further use, e.g. to packaging. Naturally, two filling devices can be provided, for example, offset from each other by roughly 180° along the rotor 12, and correspondingly two pre-compression stations and main compression stations are provided respectively. This design and the function of a tablet press 10 are known per se.

FIG. 2 shows a diagram of the density of the compressed material in the die holes 16 during a compression procedure, plotted against time, and therefore also the compression force changing with time. The temporal progression is shown from the start of the compression during the entry of the upper punches 18 into the die holes before the pre-compression station 42, up to the maximum compression, that is, up to the respective upper punch 18 being completely driven into the die hole 16. Three phases can be recognized. In the first phase, labeled I, the particles located in the holes 16 are re-oriented. In a second phase, labeled II, the particles are elastically and plastically deformed. In the final and third phase, labeled III, the particles are bonded to each other. For optimally distributing and binding the powdered particles, located in the die holes 16, to each other in the compression phases I to III, in the rotary tablet press 10 shown in the figures, respective upper and lower vibration generators 64, 65, 66 are provided along the vertically force progression axes, shown in FIG. 1 at the reference numbers 61, 62, 63, extending in the vertical direction through the control cams 30, 32 between the filling device 34 and the pre-compression station 42, guiding the upper punch 18 (and marginally also the lower punch 20) into the die holes, and through the rotational axes of the pre-compression rollers 46, 48 and the main compression rollers 50, 52. The vibration generators 64, 65, 66 can be, e.g., ultrasonic actuators, electrical actuators and/or mechanical vibration actuators. First vibration actuators 64 are assigned to the upper and lower control cams 30, 32. Second and third vibration actuators 65, 66 are respectively assigned to the upper and lower pre-compression rollers 46, 48 and the upper and lower main compression rollers 50, 52. The vibration generators 64, 65, 66, in the example shown, vibrate the control cams 30, 32 and compression rollers 46, 48, 50, 52, and therefore also the upper punches 18 and lower punches 20 that are in engagement with these by means of their punch heads 19, 21 while passing the control cams 30, 32 or the pre-compression stations and main compression stations 42, 44. In the process, the upper and lower punches 18, 20 are caused to vibrate in the vertical direction. A suitable control device can be provided (not shown) for controlling the vibration generators 64, 65, 66. It is understood that it is not necessary to provide all the vibration generators 64, 65, 66 shown in FIG. 1. Rather any arbitrary combination of a vibration generators 64, 65, 66 is conceivable, vibration generators could be provided only in the area of the control cams 30, 32 and/or only in the area of the pre-compression and/or main compression rollers (46, 48, 50, 52), or only upper or only lower vibration generators could be provided at one or more of the regions of the press provided with vibration generators.

The vibration generation will now be explained in more detail based on the representation shown in FIG. 3. FIG. 3 shows a section of the tablet press 10 from FIG. 1, in a further vertical sectional view. A machine frame 68, at which the rotor 12 is supported rotating about the vertical axis 70, can be recognized. For rotating the rotor 12, a belt drive is provided, shown here schematically with the reference number 72. The rotational motion of the belt drive 72 is transferred to the rotor 12 in a known manner using a suitable gearing 74. Furthermore, it can be seen in FIG. 3 that the upper pre-compression roller 46, shown here as an example, interacts with an upper force generating device 76, and the lower pre-compression roller 48 interacts with a lower force generating device 78. By means of these force generating devices 76, 78 the appropriate compression forces are exerted on the pre-compression rollers 46, 48. The compression rollers 46, 48 are stimulated to vibrate vertically along the vertical force progression axis 62 by the vibration actuators 65, as indicated by the arrows 80, 82 in FIG. 3. The reference numbers 84, 86 schematically indicate in each case the compression force progression during compression of tablets in the die holes 16. It can be recognized that the compression force progression has the shape of a standard sine curve. Here, each vibration peak represents the compression force progression during the compression of a tablet in the pre-compression station 42. The vibration 88, 90 of the compression rollers 46, 48 and with it of the punches 18, 20, generated by the vibration generator 65, is also shown in FIG. 3 by way of illustration, superimposed on the compression force progression 84, 86. The frequency of the vibrations 88, 90 is substantially higher than the frequency of the compression force progression 84, 86. The vibrations can be applied to the punches 18, 20 in the area of the pull-down cams 30, 32 and the main compression station 44 in an analogous manner.

Using the rotary tablet press 10 according to the invention and the method according to the invention, tablets having the respectively required fracture resistance can be produced in a reliable manner, wherein the tendency to form cracks is reliably reduced. At the same time, the tablets are produced more cost-effectively and with lower sound emissions.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A rotary tablet press comprising:
a rotatingly drivable rotor (12), having a die plate (14) comprising die holes (16) and assigned to the die holes (16) upper and lower punches (18, 20), rotating synchronously with the die plate (14), whose axial movement is controlled by upper and lower control cams (30, 32),
at least one filling station (34) comprising at least one filling device (36) for filling the die holes (16) with material to be pressed,
at least one compression station (42, 44) disposed downstream of the filling station (34) in the rotational direction of the rotor (12), comprising at least one compressing device (46, 48, 50, 52) which presses the upper and/or lower punches (18, 20) into the die holes (16) when passing through the at least one compression station (42, 44) in order to press the filled material in the die holes (16),
and at least one ejector station (56), disposed downstream of the at least one compression station (42, 44) in the rotational direction of the rotor (12), comprising an ejector device (58) for ejecting the pressed tablets (54) in the die holes (16),
characterized in that in the rotational direction of the upper and lower punches (18, 20) between the at least one filling station (34) and the at least one ejector station (56), at least one vibration generator (64) is disposed between the at least one filling station (34) and the at least one compression station (42, 44) in the area of an upper and/or lower control cam (30, 32) for the upper and/or lower punches (18, 20), that at least temporarily vibrates the upper and/or lower punches (18, 20) while passing the upper and/or lower control cam (30, 32).

2. A rotary tablet press comprising:

a rotatingly drivable rotor (12), having a die plate (14) comprising die holes (16) and assigned to the die holes (16) upper and lower punches (18, 20), rotating synchronously with the die plate (14), whose axial movement is controlled by upper and lower control cams (30, 32), at least one filling station (34) comprising at least one filling device (36) for filling the die holes (16) with material to be pressed, at least one compression station (42, 44) disposed downstream of the at least one filling station (34) in the rotational direction of the rotor (12), comprising at least one compressing device (46, 48, 50, 52) which presses the upper and/or lower punches (18, 20) into the die holes (16) when passing through the at least one compression station (42, 44) in order to press the filled material in the die holes (16), and at least one ejector station (56), disposed downstream of the at least one compression station (42, 44) in the rotational direction of the rotor (12), comprising an ejector device (58) for ejecting the pressed tablets (54) in the die holes (16), characterized in that at least one vibration generator (65, 66) is disposed at the at least one compression station (42, 44) which at least temporarily vibrates the upper and/or lower punches (18, 20) in the at least one compression station (44).

3. The rotary tablet press according to claim 2, characterized in that the at least one compression station (42, 44) has a pre-compression station (42) and a main compression (44).

4. The rotary tablet press according to claim 3, characterized in that at least one vibration generator (65, 66) is disposed at the pre-compression station (42) and/or at the main compression station (44) that at least temporarily vibrates the upper and/or lower punches (18, 20) in the pre-compression station (42) and/or in the main compression station (44).

5. The rotary tablet press according to claim 1, characterized in that the at least one vibration generator (64, 65, 66) is an ultrasonic vibration generator and/or an electrical vibration generator and/or a mechanical vibration generator.

6. The rotary tablet press according to claim 2, characterized in that the at least one vibration generator (64, 65, 66) is designed so that the upper and/or lower punches (18, 20) are vibrated during the entire compression of the material filled into the die holes (16).

7. The rotary tablet press according to claim 2, characterized in that the at least one vibration generator (64, 65, 66) is an ultrasonic vibration generator and/or an electrical vibration generator and/or a mechanical vibration generator.

* * * * *